(12) United States Patent
Toosky

(10) Patent No.: US 8,262,331 B2
(45) Date of Patent: Sep. 11, 2012

(54) INTEGRATED EXPANDING SLEEVE HOLE FILLING THREADED FASTENER

(75) Inventor: Rahmatollah F. Toosky, San Clemente, CA (US)

(73) Assignee: Polaris Fastening Consulting, LLC, San Clemente, CA (US)

(*) Notice: Subject to any disclaimer, the term of this patent is extended or adjusted under 35 U.S.C. 154(b) by 295 days.

(21) Appl. No.: 12/773,625

(22) Filed: May 4, 2010

(65) Prior Publication Data

US 2010/0278608 A1    Nov. 4, 2010

Related U.S. Application Data

(60) Provisional application No. 61/175,112, filed on May 4, 2009.

(51) Int. Cl.
*F16B 13/06*    (2006.01)
(52) U.S. Cl. ............... 411/69; 411/57.1; 411/361
(58) Field of Classification Search ............... 411/44, 411/57.1, 69, 338, 339, 361
See application file for complete search history.

(56) References Cited

U.S. PATENT DOCUMENTS

| | | | |
|---|---|---|---|
| 3,835,615 A * | 9/1974 | King, Jr. ............... | 403/408.1 |
| 4,048,898 A * | 9/1977 | Salter ............... | 411/44 |
| 4,102,036 A * | 7/1978 | Salter ............... | 29/525 |
| 4,244,661 A * | 1/1981 | Dervy ............... | 403/243 |
| 4,405,256 A * | 9/1983 | King, Jr. ............... | 403/408.1 |
| 4,850,771 A * | 7/1989 | Hurd ............... | 411/43 |
| 6,042,315 A | 3/2000 | Miller et al. | |
| 6,773,215 B2 | 8/2004 | Cuva et al. | |
| 7,695,226 B2 * | 4/2010 | March et al. ............... | 411/43 |

* cited by examiner

*Primary Examiner* — Flemming Saether
(74) *Attorney, Agent, or Firm* — Loza & Loza LLP; Heidi L. Eisenhut

(57) ABSTRACT

A novel fastener is provided which includes an expanding sleeve for receiving a pin where the pin has shank terminating at a first end in a pin head and terminating at a second end in an externally threaded portion of the pin. The expanding sleeve may include a hollow tubular shank terminating at a first end in a sleeve head and having an opening at a second sleeve end for receiving the pin. The sleeve head include an internal sleeve head surface for engagement with an external pin head side surface when in an assembled position. When the pin and expanding sleeve in the assembled position are inserted into an aperture in a structure, a gap is formed between the aperture and an outer surface of the expanding sleeve. The outer surface of the expanding sleeve radially expands outward into the aperture filling the gap upon engagement of the internal face of the sleeve head and the external pin head surface.

11 Claims, 9 Drawing Sheets

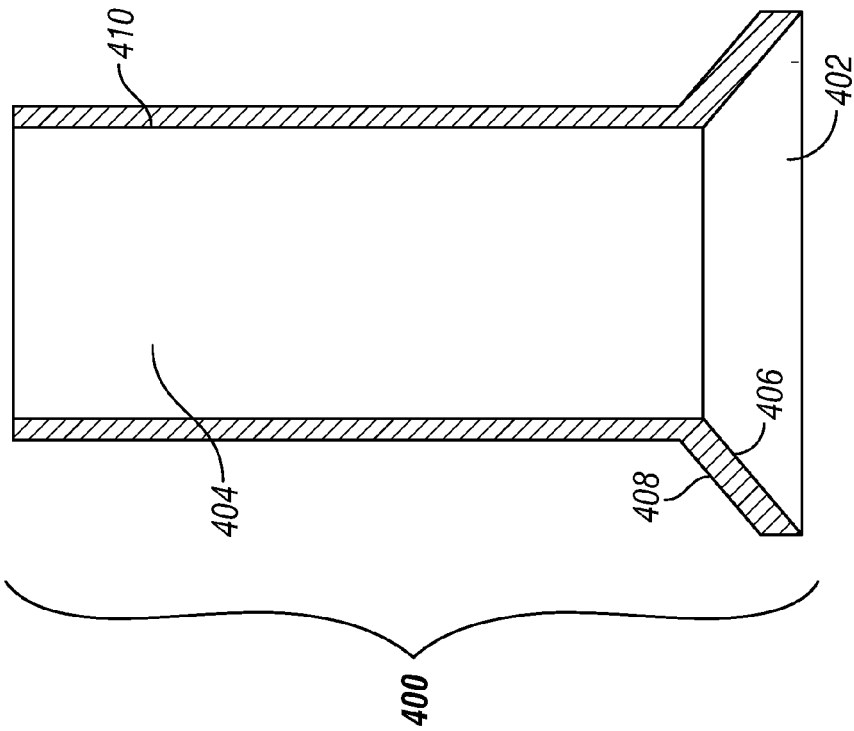
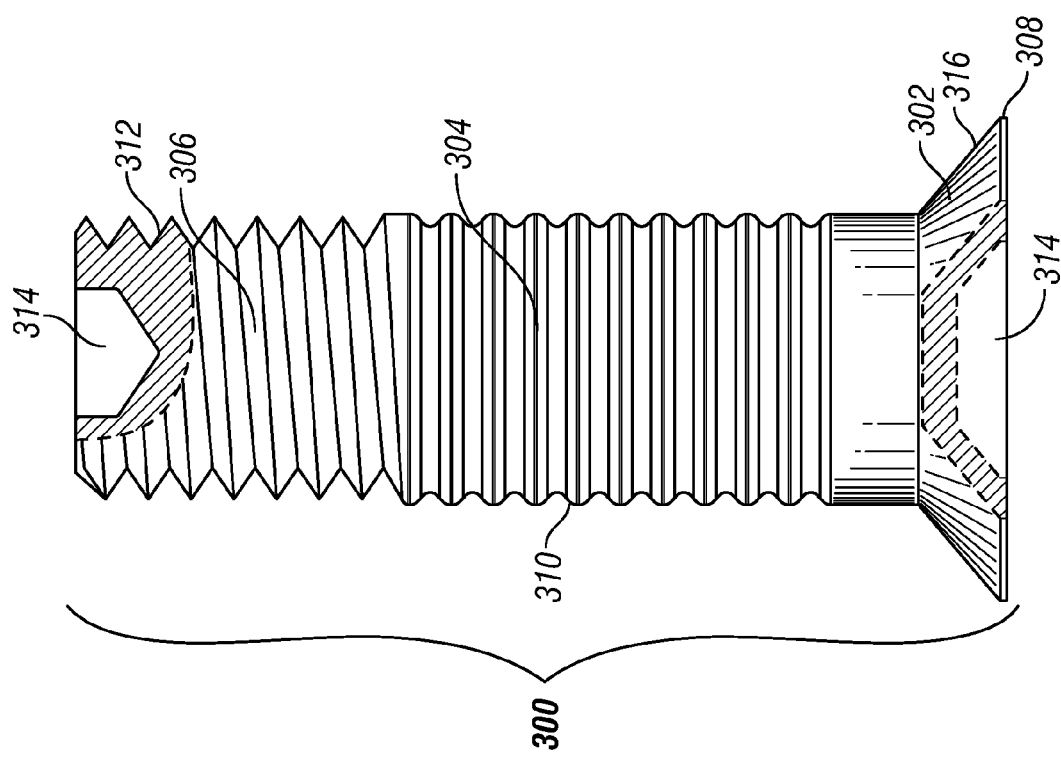

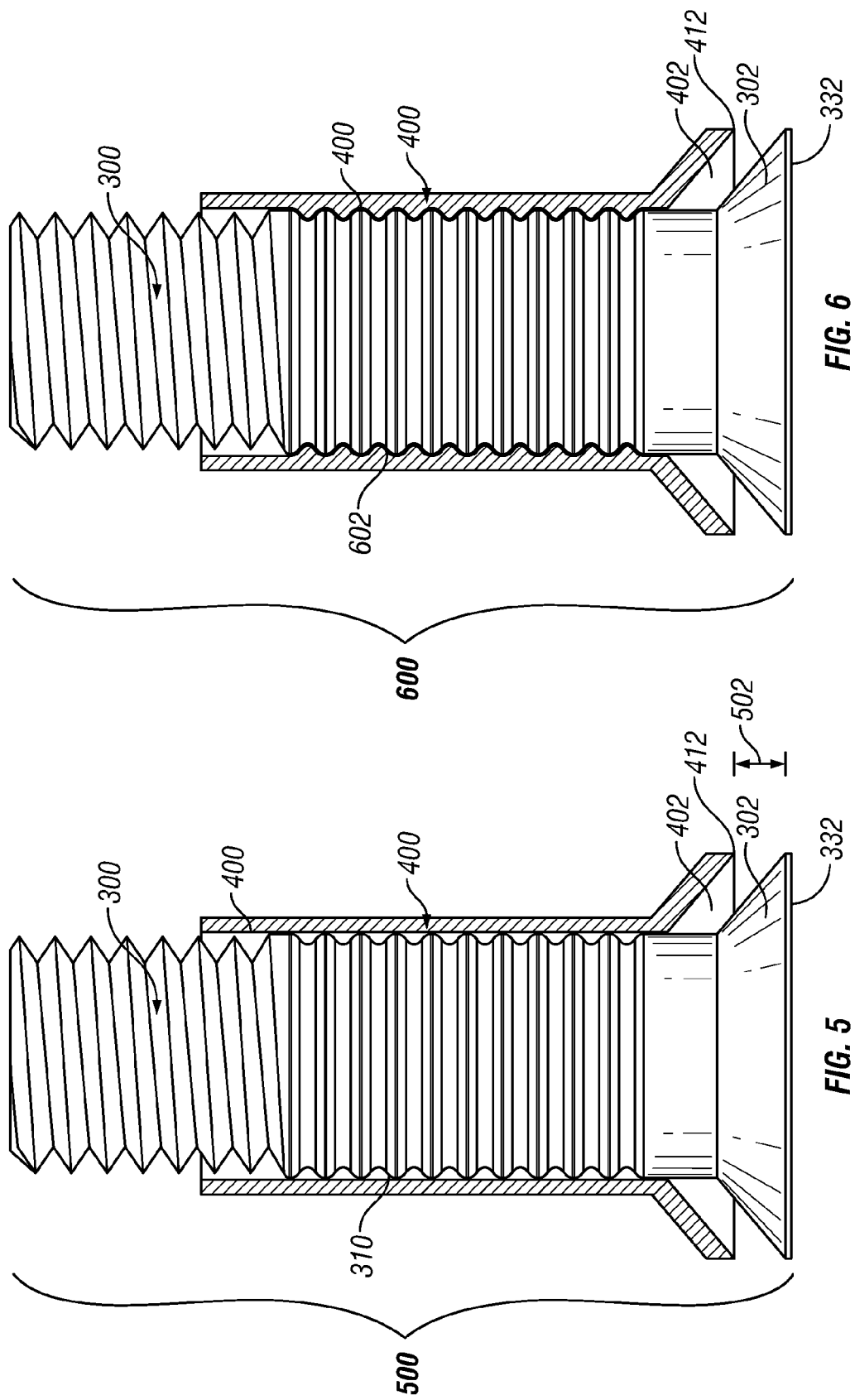

INTEGRATED EXPANDING SLEEVE HOLE FILLING THREADED FASTENER

CLAIM OF PRIORITY UNDER 35 U.S.C. §119

The present application for patent claims priority to U.S. Provisional Application No. 61/175,112 entitled "INTEGRATED EXPANDING SLEEVE HOLE FILLING THREADED FASTENER", filed May 4, 2009 and is hereby expressly incorporated by reference herein.

FIELD

Various embodiments of the invention pertain to threaded fasteners.

BACKGROUND

In general, complex manmade structures, whether stationary such as buildings and bridges, or mobile such as moving vehicles operating on land, sea, air, or space, are normally made from many components attached together forming a complex structure. The design of attachment points, commonly known as joints, requires special skill for engineering design and analysis. A major part of this task is the selection of proper components, such as fasteners, for joining and fastening the structure together.

The main purpose and primary object in joint design is to facilitate the load transfer from one component of the structure to another component. The joined structure should be able to sustain the external and internal loads that may be experienced while performing its intended function. Loading may be in sustained static form or in a variable dynamic form. The functioning environment may be corrosive in nature affecting material properties and integrity of the fasteners and structural material. The operating environment may also undergo temperature changes affecting the load carrying characteristics of the joint and fastener.

Since humankind's original venture into building structures and moving vehicles, many types of fasteners have been conceived, developed, and used successfully. However, with a developing civilization the need for improved fasteners is always evident. One common feature in many conventional joint designs is to create holes, or apertures, in the joint components, typically referred to as work pieces, to insert and attach the components to each other by placing a suitable fastener in the matching holes. These fasteners, referred to by many different names and terms, are major contributors for constructing buildings, tools, vehicles, and other important structures that sustain the present form of civilization and human life in modern societies.

Typical fasteners used today are inherent with problems. As described in more detail below, although typical nuts and bolts are capable of carrying tensile and shear loads, when applying typical nuts and bolts in structures, a major disadvantage occurs as there is a lack of a hole filling feature. That is, a hole or space is remaining after insertion of the fastener. One common approach adopted to overcome this disadvantage is to provide a hole filling feature by installing a bolt or shear pin fastener in a small interference hole. However, this is not practical or recommended for composite structures, as interference fit installations cause damage such as cracks and delamination in the composite structure, thus compromising the integrity of the structural components.

Consequently, a fastener which alleviates the problems inherent in conventional fasteners as described previously is needed.

SUMMARY

One feature is directed to fastening systems which provide controlled and limited hole filling capability for joining composite structures. These systems may prevent the occurrence of damage to the structural components while creating a condition of tight holes for immediate and simultaneous transfer of shear load to all the fasteners within the joint.

According to another feature, a high level of hole fill and interference is provided that may significantly increase the fatigue life of the joint while maintaining the installation loads within practical limits by utilizing the fasteners of the present invention. Furthermore, utilizing the fasteners of the present invention may be highly beneficial for improving the structural joint integrity for brittle structures, nonmetallic composite structures, and ductile metallic structures. Additionally, the fasteners of the present invention may allow material combinations of the sleeve and pin to be chosen which permit designing high strength fasteners with special beneficial features for joints requiring material compatibility for improved corrosion resistance, enhanced sealing capabilities, and other special features such as high temperature applications, controlled electrical conductivity, and magnetic permeability.

Yet another feature provides for a fastener for securing one or more components of a structure. The fastener may include a pin having an elongated pin shank terminating at a first pin end in a pin head and terminating at a second pin end in an externally threaded portion, the pin head having an external pin head side surface; and an expanding sleeve having a hollow tubular shank terminating at a first sleeve end in a sleeve head and having an opening at a second sleeve end for receiving the pin, the sleeve head having an internal sleeve head surface for engagement with the external pin head side surface when in an assembled position; where the pin and expanding sleeve in the assembled position are inserted into an aperture in the structure forming a gap between the aperture and an outer surface of the expanding sleeve, the outer surface of the expanding sleeve radially expands outward into the aperture filling the gap upon engagement of the internal face of the sleeve head and the external pin head side surface.

Yet another feature includes a sleeve pin gap in the fastener formed between a pin head bottom surface and a bottom surface of the structure. The sleeve pin gap closes when applying a force axially to the pin head bottom surface causing the engagement of the internal face of the sleeve head and the external pin head side surface. Alternatively, the sleeve pin gap closes when tightening a nut threaded onto the externally threaded portion of the pin which moves the pin axially causing the engagement of the internal face of the sleeve head and the external pin head side surface.

BRIEF DESCRIPTION OF THE DRAWINGS

Various features, nature and advantages may become apparent from the detailed description set forth below when taken in conjunction with the drawings in which like reference characters identify correspondingly throughout.

FIG. 3 illustrates a side view of a pin in accordance with an aspect.

FIG. 4 illustrates a side view of an integrated expansion sleeve in accordance with an aspect.

FIG. 5 illustrates a side view of a pin and integrated expansion sleeve in a pre-assembled condition in accordance with an aspect.

FIG. 6 illustrates a side view of a pin and expansion sleeve in an assembled form in accordance with an aspect.

DETAILED DESCRIPTION

In the following description numerous specific details are set forth in order to provide a thorough understanding of the invention. However, one skilled in the art would recognize that the invention might be practiced without these specific details. In other instances, well known methods, procedures, and/or components have not been described in detail so as not to unnecessarily obscure aspects of the invention.

Nuts and Bolts

Figure 1:
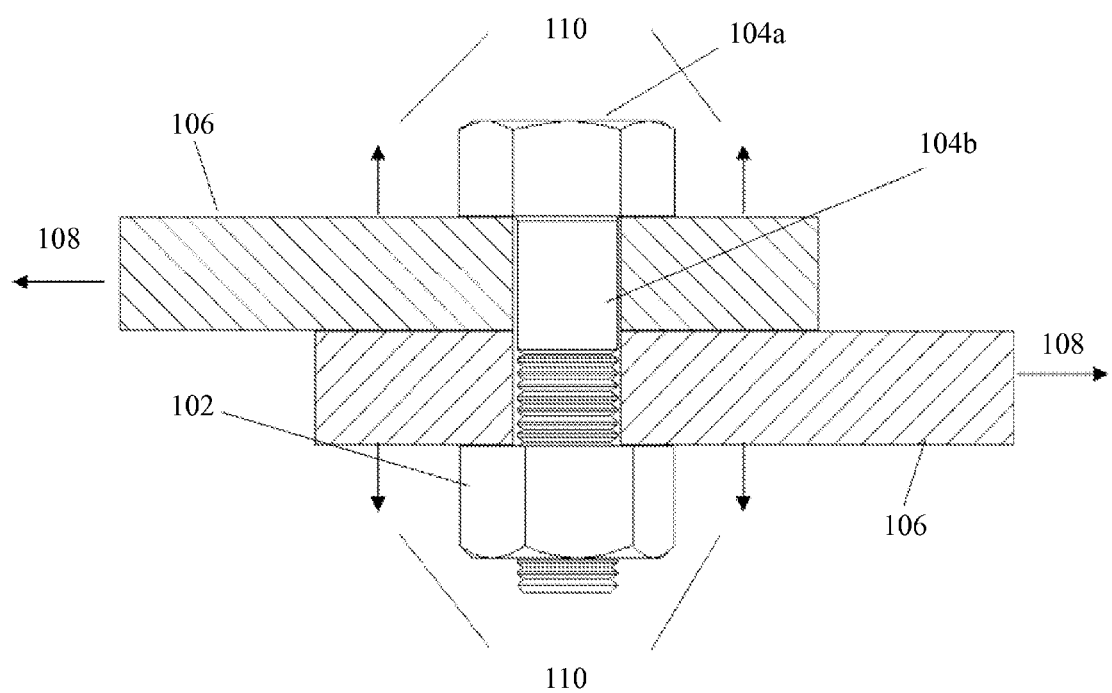
FIG. 1 illustrates a cross sectional view of a typical nut and bolt.

FIG. 1 illustrates a cross sectional view of a typical nut 102 and bolt 104. Nuts and bolts (comprising a bolt head 104a and a bolt shank 104b) may be the most versatile, useful and effective fastener used for joining many types of structures both in static and dynamic applications. The internal helical threads of the nut may engage the matching external threads of the bolt by turning the nut relative to the bolt, and as a result, the interfacing surface of the nut and bolt with the surface of the structure 106 will push the structural components tightly together. Once pushed tightly together, a tightening torque may be applied until the desirable preload 110 required to join the components of the structure together is achieved. Typical nuts and bolts are capable of carrying the tensile and shear loads 108, however, when using and applying nuts and bolts in structures, as described above, a major disadvantage occurs as there is a lack of a hole filling feature.

Threaded Shear Pin Fasteners

Figures 2A, 2B:
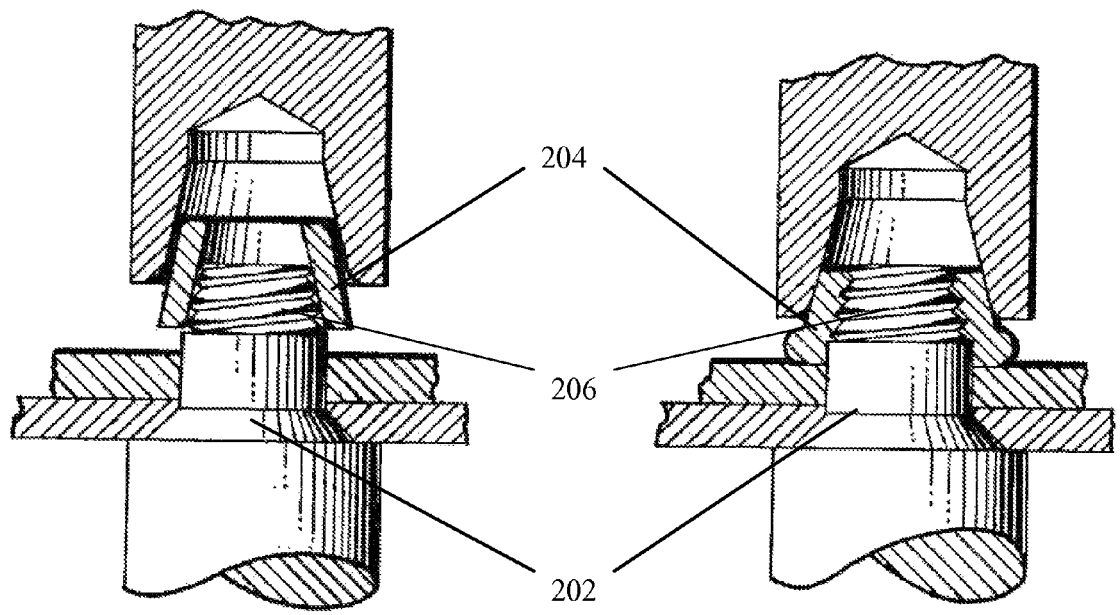
FIG. 2 (comprising FIGS. 2A and 2B) illustrates cross sectional views of typical shear pin fasteners utilized in joining of aerospace structures, general construction and many other commercial applications.

FIGS. 2A and 2B illustrates cross sectional views of typical shear pin fasteners that are utilized extensively in the joining of aerospace structures, general construction and many other commercial applications. Their mechanical properties, such as shear strength and fatigue life, are increased significantly if the pins 202 are inserted in fastener holes such that the hole is completely filled, thus eliminating relative movement and allowing immediate and simultaneous transfer of the shear load to all the fastener shanks within the joint. In a metallic structure, the importance of a hole filling fastener is significant but not crucial since the metallic structures normally have adequate ductility and compliance to distribute the shear load to all the fasteners within the joint. In composite structures, it is extremely crucial that the shear load distribution takes place simultaneously to all the fasteners within the joint.

Carbon fiber composite structures, commonly used in modern aerospace applications, lack the ductility and compliance and are fundamentally brittle in nature. Fasteners possessing hole filling features are a very effective solution for solving this problem. Another important benefit of a fastener with hole filling features is in promoting a pronounced improvement on the fatigue life of the joint for both metallic and non-metallic composite structures. Therefore, fasteners having the ability to fill the fastener holes are superior to those lacking this vital property.

A common approach adopted to provide the hole filling feature is to install a bolt or shear pin fastener in a small interference hole. This approach requires drilling precision holes, application of proper lubricant, and applying heavy loads for pushing and forcing the fastener in the hole prior to installation of the nut element, or swaging of equivalent collars 204, for fixing the pin 202 within the structure. This approach, while beneficial to a limited extent for metallic structures, is not practical or recommended for composite structures, as interference fit installations cause damage such as cracks and delamination in the composite structure, thus compromising the integrity of the structural components.

To overcome this problem, some products have been designed with integrated sleeves placed on the fastener shank. The integrated sleeves used are either of uniform wall thickness or of uniformly variable wall thickness, such as a tapered design. However, there are inherent difficulties to these designs, mainly application of high installation loads, the unpredictable magnitude of hole fill, non uniform hole fill, and the requirement of drilling precision holes and matching hole patterns in a joint, making the drilling process time consuming and very expensive.

Installations of nuts and bolts are normally time consuming and costly. Furthermore, nuts and bolts may loosen due to vibrational and dynamic forces present in most structural joints. To improve the productivity, reduce cost and insure against potential loosening of normal nuts and bolts, it is customary to swage a collar over the pin creating a stump lock bolt as is shown in FIGS. 2A and 2B. In this case, the threaded portion 206 of the pin 202 need not be of the standard helical form, which is common for regular matching of nut and bolt installation. The grooved or threaded portion 206 of the pin is normally of a design to facilitate swaging of the collar 204 into the grooved section of the pin and is of a geometry to provide adequate tensile strength and induce preload on the joint structure due to the intimate contact between the collar 204 and pin 202 grooves. Stump lock bolts are widely used in construction of aerospace structures. However, with stump lock bolts, the issues of hole fill and limited application in composite structures and brittle material is a major concern.

Overview

In accordance with an aspect, fastening systems which provide controlled and limited hole filling capability for joining composite structures are disclosed. These systems may prevent the occurrence of damage to the structural components while creating a condition of tight holes for immediate and simultaneous transfer of shear load to all the fasteners within the joint.

In accordance with another aspect, a high level of hole fill and interference to significantly increase the fatigue life of the joint while maintaining the installation loads within practical limits may be achieved by utilizing the fasteners of the present invention. That is, the pin may create a level of hole fill for installation in metallic structures capable of sustaining heavy expansion Furthermore, utilizing the fasteners of the present invention may be highly beneficial for improving the structural joint integrity for brittle structures, nonmetallic composite structures, and ductile metallic structures. Additionally, the fasteners of the present invention may allow material combinations of the sleeve and pin to be chosen which permit designing high strength fasteners with special beneficial features for joints requiring material compatibility for improved corrosion resistance, enhanced sealing capabilities, and other special features such as high temperature applications, controlled electrical conductivity, and magnetic permeability.

Exemplary Fastener

According to various embodiments, a fastener may include a core pin 300 (hereinafter referred to as "pin") as shown in FIG. 3 and an expansion sleeve 400 (hereinafter referred to as "sleeve") as shown in FIG. 4.

Figure 8:
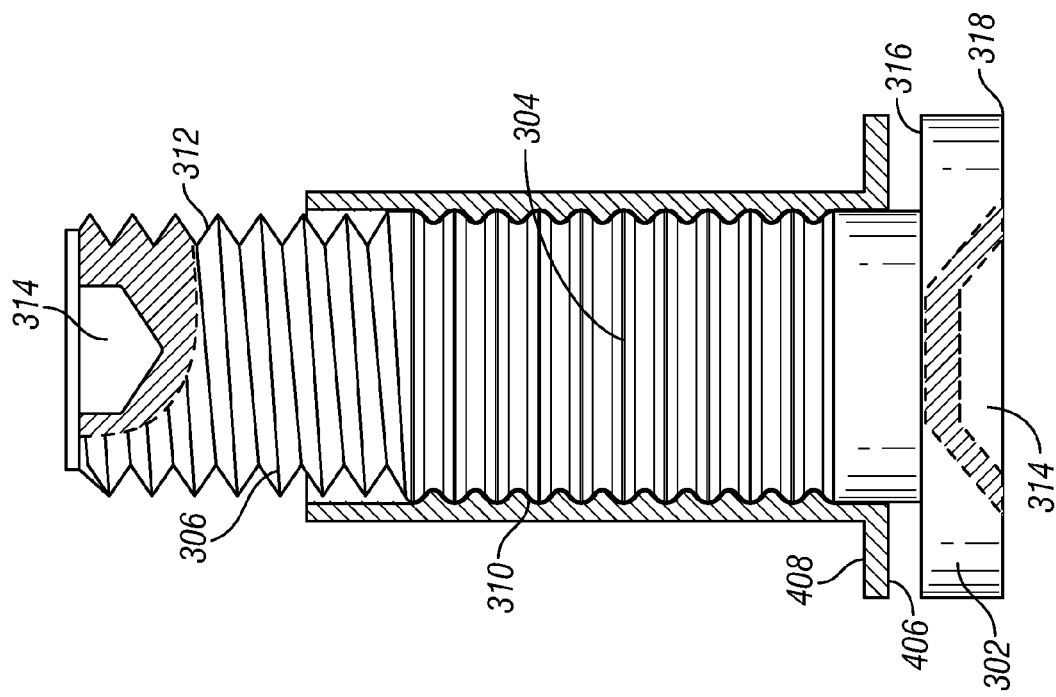
FIG. 8 illustrates a side view of a pin and integrated expansion sleeve in a pre-assembled condition in accordance with an aspect.

Turning to FIG. 3, a side view of the pin 300 in accordance with an aspect is illustrated. The pin 300 may include an elongated pin shank 304 terminating at a first pin end in a pin head 302 and terminating at a second pin end in an externally threaded portion 306. Although the pin head 302 may be in the form of a flush head design 308, as shown, this is by way of example only and other geometrical designs as required by the application of the fastener are contemplated. In addition to the flush head design 308, other geometric designs may include, but are not limited to, generic protruding head designs 318 (See FIG. 8).

Figure 9:
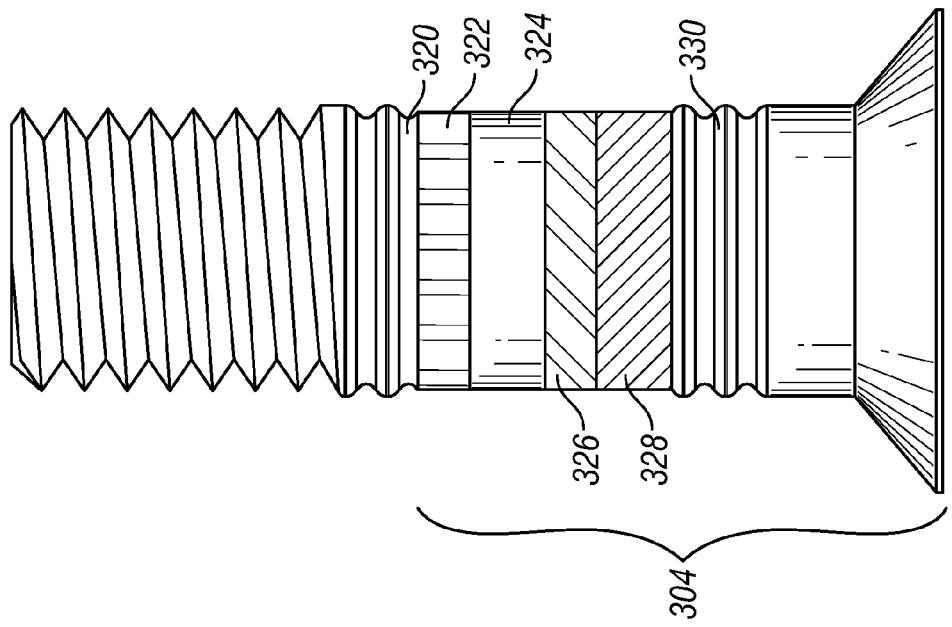
FIG. 9 illustrates a side view of a pin illustrating various geometric designs for the shank portion of the pin.

The elongated pin shank 304, integrally connected to the pin head 302 and the externally threaded portion 306, may vary in shape and size and may have a specific geometry 310 designed to interact with the sleeve 400 to facilitate expansion of the sleeve 400 within the hole or aperture of the structure with minimum installation load, as described below in further detail, during the assembly and installation process of the fastener. This specific geometry 310 may include a series of ridges and valleys of specific design and configuration which can be, for example, annular 320, axial 322, smooth 324, forward slanting diagonal 326, backward slanting diagonal 328 and helical 330, or any combination thereof (see FIG. 9) as may be required by the application of the fastener and/or material combinations of sleeve 400 and pin 300. The externally threaded portion 306 may include threads 312 which may be of standard design or of any unique geometry as may be required to interact with a corresponding nut (see FIGS. 10-11), or with a suitable matching collar (see FIG. 12), as may be required by the design and application of the fastener.

In accordance with an aspect, the pin 300 may include a recess key 314 which may be located in the pin head 302 or the externally threaded portion 306 to interface with a matching installation tool, as is well known in the art, and provide a mechanism for application of rotational torques resisting movement of the pin 300 during the tightening of the nut and installation process.

FIG. 4 illustrates a side view of an integrated expansion sleeve 400 in accordance with an aspect. The sleeve 400 may include an eleongated tubular shank 404 terminating at a first sleeve end in a sleeve head 402, integrally connected to the shank 404, and having an opening for receiving the pin 300 at a second sleeve end. The sleeve head 402 may have an internal face (or internal sleeve head surface) 406 configured for engagement with (or to accommodate and interface with) a external pin head side surface 316 of the pin 300 (See FIG. 3) and an external face (or external sleeve head surface) 408 configured for engagement with (or to accommodate and interface with) a bottom surface face or countersink cavity of a structure. That is, the form and shape of the sleeve head 402 may be designed so that the geometry of the internal sleeve head surface 406 and the external sleeve head surface 408 of the sleeve 400 may be engaged with (i.e. matched), or directly aligned with, the external pin head side surface 316 and a bottom surface 701 of a structure 700 respectively (see FIG. 7 and FIG. 8). Alternatively, the form and shape of the sleeve head 402 may be designed so that the geometry of internal sleeve head surface 406 and the external sleeve head surface 408 of the sleeve 400 may be initially mismatched such that upon installation, the sleeve head 402 deforms and conforms to the geometries of the external pin head side surface 316, and bottom surface of the structure surface, creating conditions designed to increase mechanical properties of the fastener.

In accordance with one example, the sleeve 400 may be made from a material more malleable than the material from which the pin 300 is made allowing an internal sleeve face or inner surface 410 of the expanding sleeve to expand outwardly into the grooves of the pin 300. (See FIG. 6) For example, the pin 300 may be made from high temperature metallic alloys and/or ceramic materials and the expansion sleeve 400 may be made of high temperature malleable alloys. Additionally, the sleeve 400 may be made of a material compatible with chemical properties of the material of the structure In accordance with one aspect, the surface finish of the internal sleeve head surface 406 and the external sleeve head surface 408 may vary from smooth to rough, allowing for designed selection of contact frictional forces. Additionally, the shank 404 of the sleeve 400 may be of specific length and thickness to accommodate the specified grip range of the joint which may also include addition of a washer 716 to the structural joint. (See FIG. 10) The washer 716 may be coupled to the nut to produce a locking feature promoting retention of a tight joint and applied preload in applications where dynamic and vibrational forces are present. Furthermore, the washer 716 may remain disengaged with the nut 706 during tightening.

Figure 13:
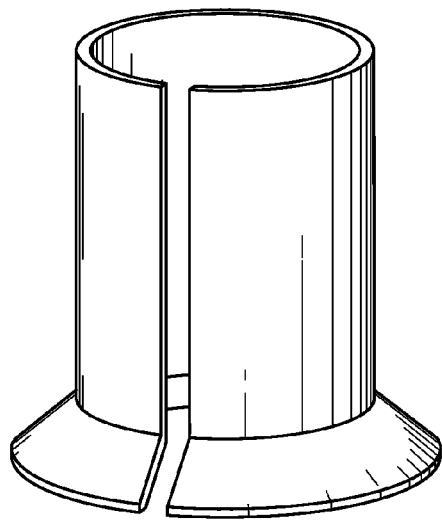
FIG. 13 illustrates a side view of a split sleeve having a straight longitudinal cut in accordance with an aspect.
Figure 14:
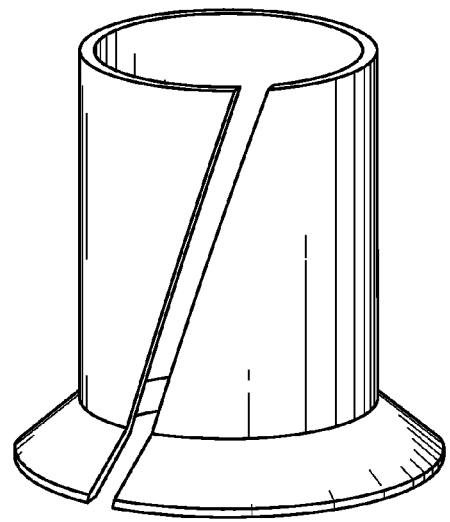
FIG. 14 illustrates a side view of a split sleeve having an angular cut in accordance with an aspect.
Figure 15:
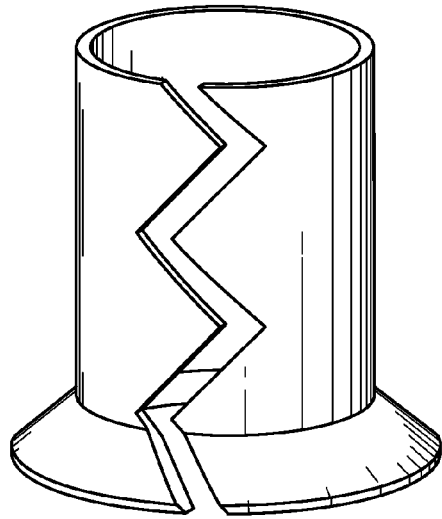
FIG. 15 illustrates a side view of a split sleeve having a multiple angled cut in accordance with an aspect.
Figure 16:
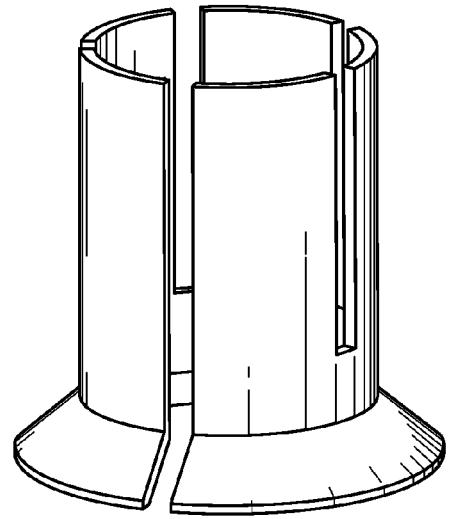
FIG. 16 illustrates a side view of a split sleeve having partial length cuts in accordance with an aspect.

The sleeve 400 may be manufactured in various forms, such as a solid cylinder, or as a split sleeve to facilitate expansion of the sleeve 400 within the hole with minimum installation load. (See FIGS. 13-16) A split sleeve design may be preferred in order to reduce the expansion load required to acquire the necessary hole fill. The split may be of any combination of a longitudinal, angular, or helical cut, and may run the full length of the sleeve, or any partial distance, as may be required by the design, function, material combination, required expansion, and limitations on expansion force required for installation. FIG. 13 illustrates a side view of a split sleeve having a straight longitudinal cut in accordance with an aspect. FIG. 14 illustrates a side view of a split sleeve having an angular cut in accordance with an aspect. FIG. 15 illustrates a side view of a split sleeve having a multiple angled cut in accordance with an aspect. FIG. 16 illustrates a side view of a split sleeve having partial length cuts in accordance with an aspect.

Figure 17:
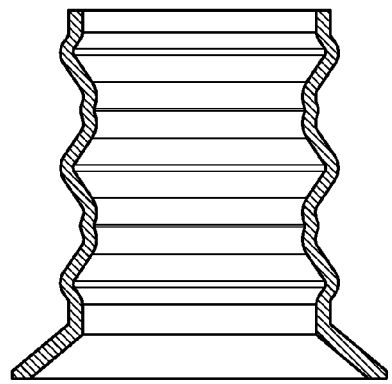
FIG. 17 illustrates a side view of a variable sleeve wall in accordance with an aspect.

Furthermore, the sleeve may be manufactured with a uniform and straight tubular shank 404 or with specific geometry and design (see FIG. 17). Such a design may allow for the sleeve 400 to be made from material equal in hardness and strength of the pin 300 as the preload built into the sleeve 400 may act like a spring when engaged and upset by the pin to fill the hole.

The sleeve 400 and pin 300 may be manufactured from material with specific mechanical and physical properties to satisfy basic joint requirements of strength, corrosion resistance, sealing, high temperature environments, electrical resistance and other compatibility issues, as may be required by the application of the fastener.

In accordance with one aspect, the pin 300 and/or sleeve 400 may be coated and/or lubricated to modify physical and chemical properties and frictional forces, or left in the bare condition as may be required by the application of the fastener and the chosen material combinations.

FIG. 5 illustrates a side view of the pin 300 and the cylindrical expansion sleeve 400 in a pre-assembled condition 500 in accordance with an aspect. In the pre-assembled condition 500 the pin 300 may be inserted into a through hole or opening of the sleeve 400 so that the pin head 402 of the sleeve may be positioned so as to create a sleeve pin gap 502. The sleeve pin gap 502 may be the distance between a pin head bottom surface 332 of the pin 300 and a bottom edge 412 of the sleeve head 402. The pre-assembled pin and sleeve 500 may then be placed within a set of roller dies, or other specifically designed tools, which can exert an inwardly radial force such that an the internal sleeve face 410 and pin shank specific geometry 310 may become intimately coupled as shown in an assembled condition 600 in FIG. 6. That is, the internal sleeve face 410 of the sleeve 400 partially or completely fills grooves within the pin 300.

Fastener Installation

Figure 7:
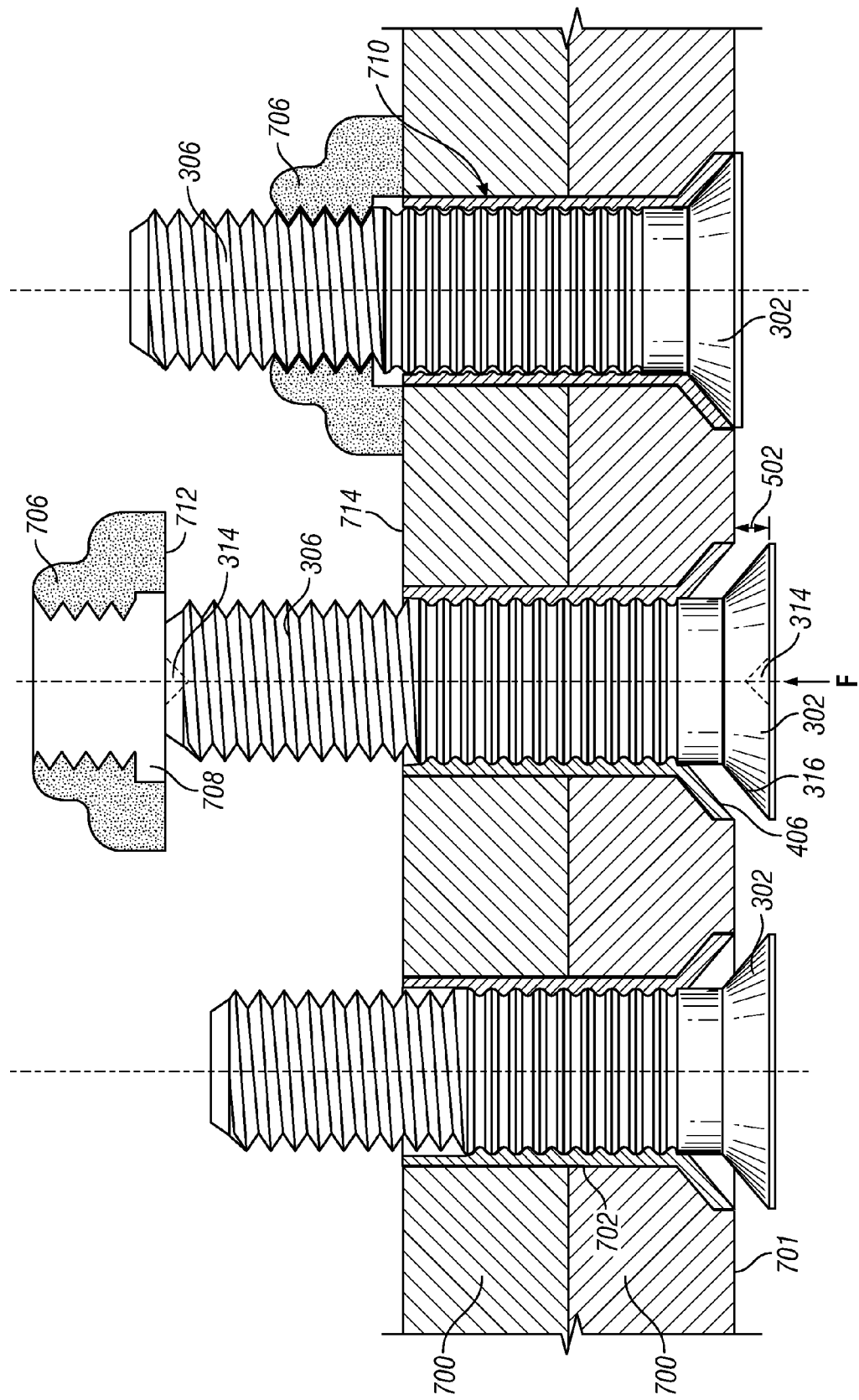
FIG. 7 illustrates the process of a fastener being secured to a structure with a nut in accordance with an aspect.

FIG. 7 illustrates the installation process of a fastener being secured to a structure with a nut 706 in accordance with an aspect. As shown, the assembled fastener 600 may be inserted into an aperture 702 of a structure 700. Once inserted, a gap may be formed or exist between the aperture 702 of the structure and an outer diameter of the sleeve for providing ease of placement of the assembled fastener 600 within the structure 700. Once inserted or placed in the structure 700, the nut 706, having an optional pocket 708 to accommodate the protrusion of the tubular shank 404 out of the structure 700 in minimum grip condition (and thus accommodating for structure stack ups or grip variations), may be threaded onto the externally threaded portion 306 of the pin 300.

Figure 12:
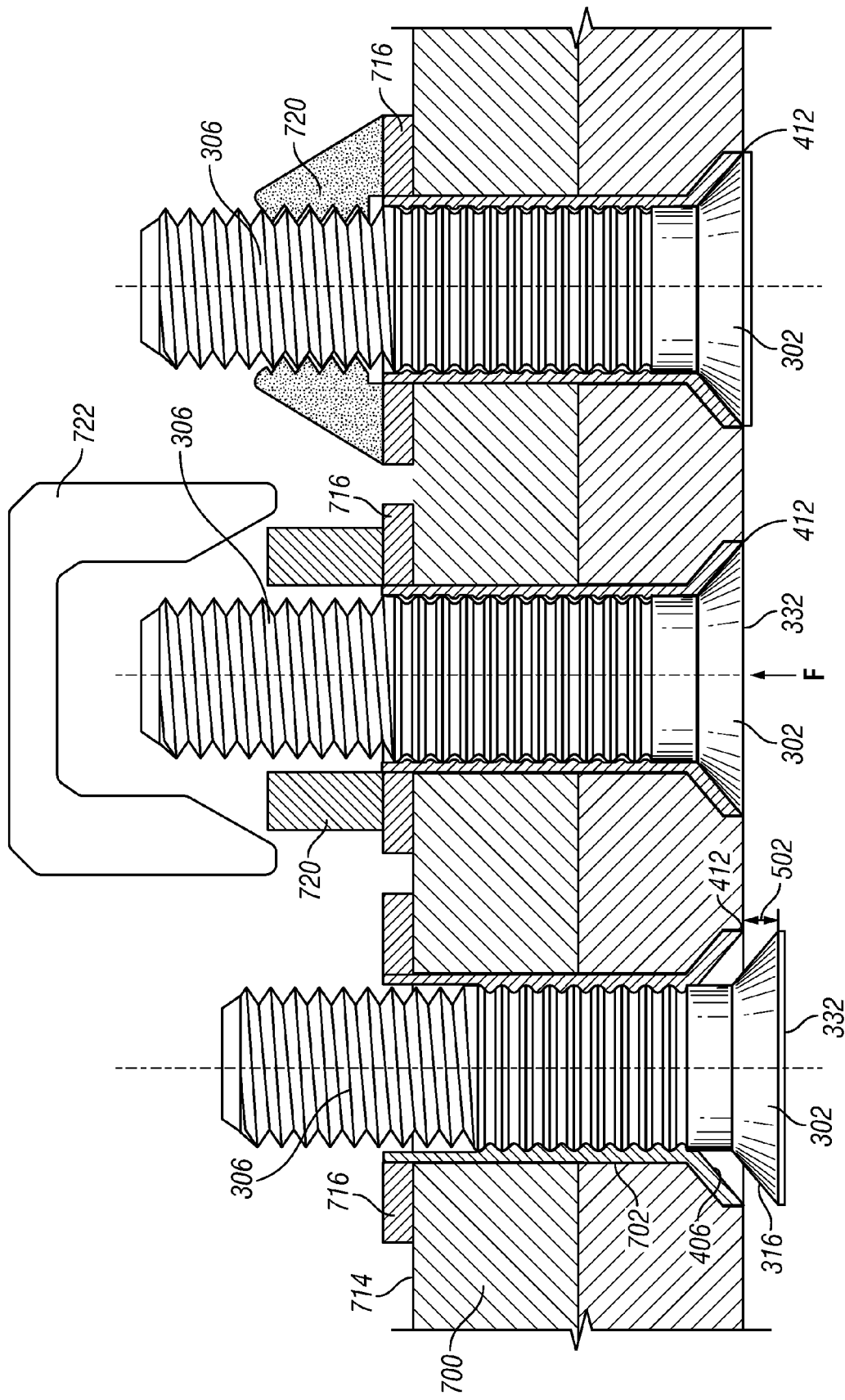
FIG. 12 illustrates the process of a fastener being secured to a structure with a collar in accordance with an aspect.

Alternatively, a deformable collar 720 may be set in place to be swaged into position upon installation (see FIG. 12). The sleeve pin gap 502 may be taken up or closed in at least one of two ways depending on design and application of the fastener. In one aspect, a force F may be applied axially on the pin head 302 via a special tool 722, as is well known in the art, such that the geometry of the external pin head side surface 316, internal sleeve head surface 406 of the sleeve head 402, external sleeve head surface 408 of the sleeve head 402 and aperture may become engaged 710 with no interstitial spacing. Then the nut 706 may be tightened to the proper specified torque load requirements of the joint, or the collar 720 may be swaged in place (see FIG. 12), depending on the design and application. When using a deformable collar 720, the threaded portion 306 of the pin 300 may include annular grooves which may be engaged with the deformable collar 720.

In another aspect, the force F may be applied and the sleeve pin gap 502 may be taken up or closed by applying enough torque to the nut 706 and resisting torque to the recess key 314 of the pin 300 such that the resulting tensile load in the pin 300 generated from tightening the nut 706 moves the pin 300 axially, closing all the gaps. The nut 706 may then be tightened to the desired torque value to cause a tight structural joint.

In both cases, the process of taking up or closing the sleeve pin gap 502 may act to shift the pin 300 axially within the sleeve 400. This shifting process may require the ridges and valleys (pin shank specific geometry) 310 of pin 300 to break coupling 602 (see FIG. 6) with the internal sleeve face 410 and force the more malleable and relatively thin walled sleeve 400 to radially expand outward into the structure's aperture 702, taking up or closing the gap 502 and creating the required hole fill 710 and as a result creating a self-sealing joint. With the sleeve pin gap 502 taken up by the force F, creating the hole fill 710, and the nut 706 tightened to the desired torque value as may be required by the application of the fastener, installation may be complete. In other words, as the gap 502 between the sleeve head 402 and pin head 302 is closed as a result of axial movement of the pin 300 upon the tightening of the nut 706 or application of an external force, the sleeve material is dislocated radially outward to fill the hole in the structure creating a tight self-sealing joint.

By employing specific patterns of ridges and valleys on the pin shank 504, selecting proper sleeve wall thicknesses, and by choosing material combinations for both pin 300 and sleeve 400, as well as applying lubricants and surface conditions on an outer surface of the pin, pin shank specific geometry 310 and/or internal sleeve face 410, the magnitude of hole fill and installation force F may be controlled and manipulated.

Figure 10:
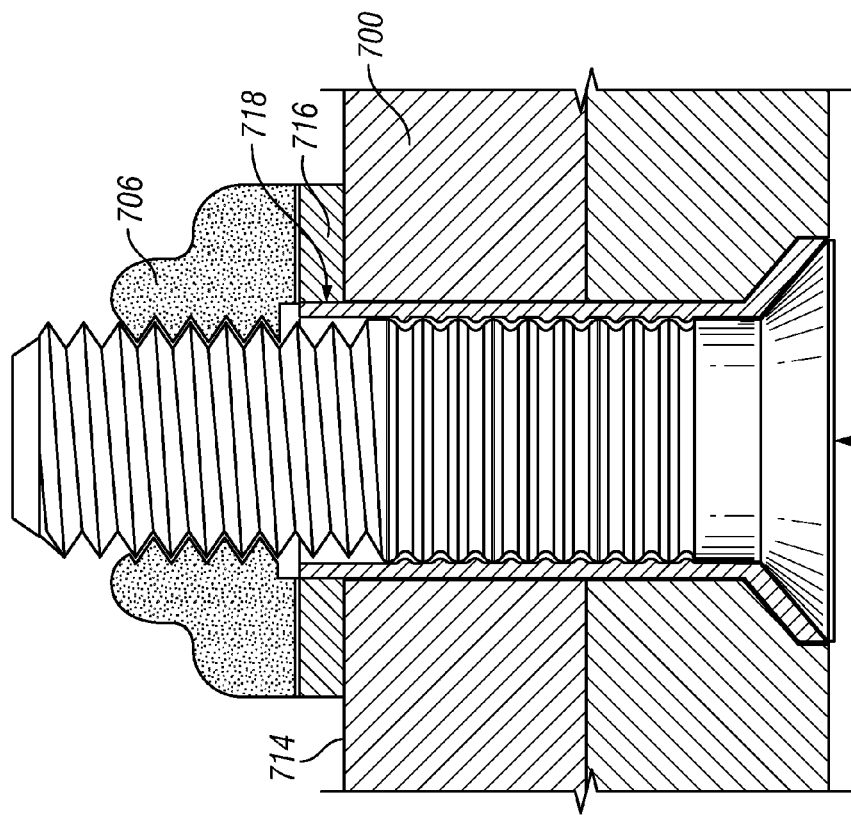
FIG. 10 illustrates a pre-assembled fastener in a structure having a washer between a nut and surface of the structure.

In order to uniformly distribute the compressive forces exerted by a nut face 712 contacting the surface 714 of the structure, a washer 716 may be added (See FIG. 10). The washer may withstand the pressure exerted by the face of the nut 712 as it contacts the surface 714 of the structure. Furthermore, the washer 716 may have constant and predictable frictional properties facilitating the prediction of preload in a joint in the structure based on monitoring a tightening torque.

Figure 11:
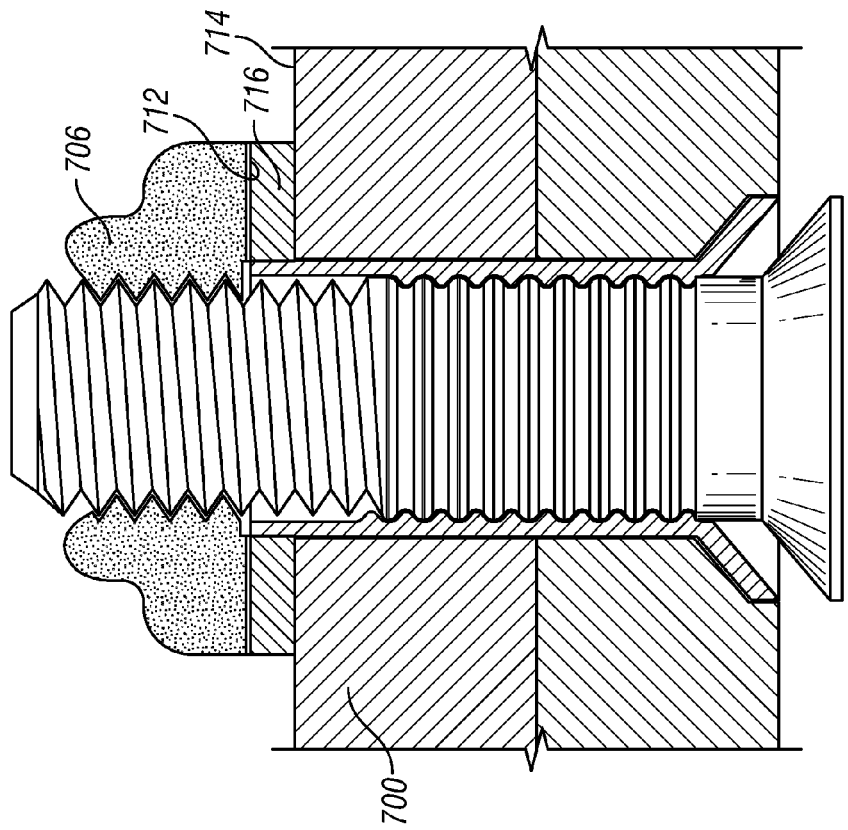
FIG. 11 illustrates an assembled fastener in a structure having a washer between a nut and surface of the structure.

In accordance with an aspect, as shown in FIG. 10, the sleeve 400 may be designed such that it protrudes beyond the surface 714 of the structure 700 allowing the sleeve 400 to engage with the washer 716. As shown in FIG. 11, upon application of an installation load F, the sleeve 400 may engage and expand within the washer 716 making its functionally a part of the fastener 718.

To enhance corrosion properties of a joint, sealants in the hole and outer surface of the fastener may be applied. The design of the present invention lends itself readily to application of sealant offering protection to both the structure and fastener by preventing the onset of galvanic corrosion caused by dissimilar metals in contact. Light weight materials, such as aluminum alloys and magnesium alloys, are readily vulnerable to galvanic corrosion when they are in contact with other nobler materials such as nickel, titanium, or stainless steel alloys. Many light weight aerospace structures are attached with high strength fasteners made from more noble alloys.

In many applications sealants are recommended and used for the purpose of protecting against fluid leakage through the fastener hole. Fasteners of the present invention, due to their complete hole filling capability, may offer a sealing feature in the joint with or without sealant making it more suitable for application in fuel tanks and other similar applications.

It is an established fact, and those experienced and trained in the field of the threaded fastener installation and application know, that the very important property value of the preload is mainly controlled by controlling the value of the applied tightening torque. The relationship between torque and tension is determined through the following equation, where T is the Torque, n is the nut factor, F is the preload force, and D is the bolt diameter.

$$T = n*F*D$$

This tightening torque is a function of many factors that vary significantly for each installation, making inducing the desired value of preload unpredictable. Studies conducted on this subject and references in technical literature show that predicting the value of bolt preload by measuring the tightening torque is only accurate to +/−30% of the intended value. These studies also show that nearly 50% of the measured tightening torque is consumed in overcoming the frictional force between the nut face 712 and the structures surface 714. Predicting the frictional resistance of nut turning on the structural surface as the preload is applied in an increasingly higher value towards the expected value is a complex phenomenon.

As the nut turns against the surface of the structure, the magnitude of coefficient of friction may change significantly due to break down of the surface finishes and lubrication, causing the onset of galling which may adversely affect the predictability of the bolt preload value. In case of composite structures, the problem is even more complicated due to the potential danger of crushing the fibers and changing the state of frictional forces, greatly affecting the value of the nut factor. The damaged fibers would adversely affect the integrity of the composite structure. In joining the composite structure, it is thus more important to employ a washer that does not turn against the structure, distributing the compressive forces around the hole and has a predictable coefficient of friction in contact with the nut surface as they turn relative to each other.

One or more of the components and functions illustrated in FIGS. 1-17, may be rearranged and/or combined into a single component or embodied in several components without departing from the invention. Additional elements or components may also be added without departing from the invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications are possible. Those skilled, in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

The invention claimed is:

1. A fastener, in a pre-assembled configuration, for securing one or more components of a structure comprising:
   an expanding sleeve having a hollow tubular shank, the hollow tubular shank having a first sleeve end and a second sleeve end, the first sleeve end connected to a sleeve head; and
   a pin having a pin head integrally connected to an elongated pin shank received within the hollow tubular shank of the expanding sleeve, the elongated pin shank comprising:
      a smooth section integrally connected to the pin head;
      a threaded section partially protruding through the second sleeve end; and
      a annular section integrally connected between the threaded section and the smooth section and where the annular section includes a series of annular ridges and valleys and; the expanding sleeve has a corresponding shape integrally formed into the annular section.

2. The fastener of claim 1, further comprising a sleeve pin gap between a bottom surface of the sleeve head and a bottom surface of the pin head.

3. The fastener of claim 1, wherein the sleeve includes one or more axial or diagonal slits for facilitating the expansion of the sleeve within the aperture.

4. The fastener of claim 1, wherein the expanding sleeve is coated with a sealant or corrosion preventing coating for providing protection and preventing corrosion.

5. The fastener of claim 1, wherein the sleeve is made of a material compatible with chemical properties of the material of the structure.

6. The fastener of claim 1, further comprising a recess key located within the threaded section for interfacing with an installation tool.

7. The fastener of claim 1, further comprising a recess key located within the pin head for interfacing with an installation tool.

8. A fastener, in a pre-assembled configuration, for securing one or more components of a structure comprising:
   an expanding sleeve having a hollow tubular shank, the hollow tubular shank having a first sleeve end and a second sleeve end, the first sleeve end connected to a sleeve head;
   a pin having a pin head integrally connected to an elongated pin shank received within the hollow tubular shank of the expanding sleeve, the elongated pin shank comprising:
      a smooth section integrally connected to the pin head;
      a threaded section partially protruding through the second sleeve end; and
      a specific geometry section including a series of ridges and valleys integrally connected between the threaded section and the smooth section and where the expanding sleeve has a corresponding shape integrally formed into the specific geometry section;
   wherein the specific geometry section is selected from the group including annular, axial, forward slanting diagonal, backward slanting diagonal and helical, or any combination thereof.

9. The fastener of claim 8, further comprising a sleeve pin gap between a bottom surface of the sleeve head and a bottom surface of the pin head.

10. The fastener of claim 9, wherein the sleeve includes one or more axial or diagonal slits for facilitating the expansion of the sleeve within the aperture.

11. The fastener of claim 10, wherein the sleeve is made of a material compatible with chemical properties of the material of the structure.

* * * * *